United States Patent
Yamada et al.

(10) Patent No.: US 10,134,432 B2
(45) Date of Patent: *Nov. 20, 2018

(54) FLEXURE CHAIN BLANK SHEET FOR DISK DRIVE SUSPENSION

(71) Applicant: NHK SPRING CO., LTD., Yokohama-shi, Kanagawa (JP)

(72) Inventors: Yukie Yamada, Aiko-gun (JP); Takumi Karasawa, Aiko-gun (JP)

(73) Assignee: NHK SPRING CO., LTD., Yokohama-Shi, Kanagawa (JP)

( * ) Notice: Subject to any disclaimer, the term of this patent is extended or adjusted under 35 U.S.C. 154(b) by 530 days.

This patent is subject to a terminal disclaimer.

(21) Appl. No.: 14/867,649

(22) Filed: Sep. 28, 2015

(65) Prior Publication Data
US 2016/0111116 A1 Apr. 21, 2016

(30) Foreign Application Priority Data
Oct. 15, 2014 (JP) .................................. 2014-210683

(51) Int. Cl.
*G11B 5/48* (2006.01)
(52) U.S. Cl.
CPC ............ *G11B 5/4833* (2013.01); *G11B 5/486* (2013.01)

(58) Field of Classification Search
CPC ...... G11B 5/4833; G11B 5/486; Y10T 428/11
See application file for complete search history.

(56) References Cited

U.S. PATENT DOCUMENTS

2015/0216039 A1*  7/2015  Terada .................. H05K 3/0097
                                                              174/255

FOREIGN PATENT DOCUMENTS

JP       5273271 B1    8/2013
JP       5365944 B1    12/2013

* cited by examiner

*Primary Examiner* — Gerard Higgins
(74) *Attorney, Agent, or Firm* — Holtz, Holtz & Volek PC (57) ABSTRACT

A flexure chain blank sheet includes a plurality of frame units. Each of the frame units includes a frame portion, and a plurality of flexure elements arranged within the frame portion. The frame portion includes lengthwise frames extending in a longitudinal direction of the flexure elements, and lateral frames extending in a width direction of the flexure elements. A slit that extends along the lateral frames, a connection portion, and recesses are formed between adjacent frame units. An opening width of the recesses is greater than an opening width of the slit. The connection portion includes a portion-to-be-cut which is to be cut by a cutter. The recesses allow insertion of the cutter.

11 Claims, 7 Drawing Sheets

FLEXURE CHAIN BLANK SHEET FOR DISK DRIVE SUSPENSION

CROSS-REFERENCE TO RELATED APPLICATIONS

This application is based upon and claims the benefit of priority from prior Japanese Patent Application No. 2014-210683, filed Oct. 15, 2014, the entire contents of which are incorporated herein by reference.

BACKGROUND OF THE INVENTION

1. Field of the Invention

The present invention relates to a flexure chain blank sheet for a disk drive suspension used for manufacturing a flexure of a disk drive suspension.

2. Description of the Related Art

A hard disk drive (HDD) is used in an information processing apparatus, such as a personal computer. The hard disk drive comprises a magnetic disk rotatable about a spindle, a carriage turnable about a pivot, etc. On an arm of the carriage, a disk drive suspension (which will be hereinafter simply referred to as a suspension) is provided. The suspension comprises elements such as a load beam, and a flexure disposed to overlap the load beam. A magnetic head including a slider is mounted on a gimbal portion formed near a distal end of the flexure. The magnetic head is provided with elements for accessing data, that is, for reading and writing data. The load beam and the flexure, etc., constitute a head gimbal assembly.

Various types of flexures have been put to practical use according to the required specification. As an example of a flexure, a flexure with conductors is known. The flexure with conductors includes a metal base made of a thin stainless steel plate, an insulating layer made of an electrically insulating material, such as polyimide, which is formed on the metal base, a plurality of conductors formed on the insulating layer, etc. The flexure includes a proximal portion which overlaps the load beam, and a tail portion (a flexure tail) which extends toward the rear of a baseplate.

Conventionally, as a means for enhancing the manufacturing efficiency of the flexure, a flexure chain blank sheet disclosed in, for example, JP 5,273,271 B (Patent Literature 1) and JP 5,365,944 B (Patent Literature 2) is known. In order to manufacture the flexure chain blank sheet, a number of flexure elements having the same shape are formed by etching a stainless steel plate, for example. An example of the flexure chain blank sheet is constituted by arranging a plurality of frame units longitudinally relative to the flexure elements. Each of the frame units is constituted by a frame portion and a number of flexure elements arranged at a predetermined pitch within the frame portion.

The frame portion of the flexure chain blank sheet commonly includes a pair of lengthwise frames that agrees with the longitudinal direction (dimension) of the flexure element, and a pair of lateral frames that agrees with the lateral direction (dimension) of the flexure element. In these lengthwise frames or lateral frames, positioning holes to be used in positioning the flexure chain blank sheet in the manufacturing process of the flexure may be formed at several places. For example, when a positioning hole is formed in the lateral frame, the width of the lateral frame (the dimension which is orthogonal to the longitudinal dimension of the lateral frame) must be made greater than the outside diameter of the positioning hole. However, the greater the width of the lateral frame is, the greater the length of the flexure chain blank sheet becomes. In order to reduce the width of the lateral frame, the positioning hole may be made smaller, but in that case, the positioning pin must also be made small. Reduction in the size of the positioning pin has a limit.

Depending on an apparatus or a jig to be used in the manufacturing process of the flexure, the size (outer dimensions) of a single flexure chain blank sheet may be restricted. Accordingly, if the length of the flexure chain blank sheet is increased in even the slightest terms, the number of frame units which can be formed in a flexure chain blank sheet must be reduced by one. In one frame unit, since a number of (several tens of to several hundreds of) flexure elements which are formed by etching are arranged at a predetermined pitch, reducing the frame unit by one means reducing several tens of to several hundreds of flexures per flexure chain blank sheet. Accordingly, there arises a problem that the manufacturing efficiency of flexures is drastically reduced.

BRIEF SUMMARY OF THE INVENTION

Accordingly, the object of the present invention is to provide a flexure chain blank sheet for a disk drive suspension which can keep the number of frame units as it is even if the length of a flexure is slightly increased by enabling the frame portion of the frame unit to be compact.

An embodiment relates to a flexure chain blank sheet for a disk drive suspension comprising a plurality of frame units, and each of the frame units comprises a frame portion made of a stainless steel plate, and a plurality of flexure elements arranged at a predetermined pitch within the frame portion. Each of the flexure elements includes a metal base formed of a stainless steel plate, which is the same material as the frame portion, and a conductive circuit portion formed on the metal base. The frame portion includes a first lengthwise frame and a second lengthwise frame extending in a longitudinal direction of the flexure elements, and a first lateral frame and a second lateral frame extending in a width direction of the flexure elements. Also, the frame portion comprises a slit which is formed between the first lateral frame of one of adjacent frame units and the second lateral frame of the other frame unit, a connection portion which connects between the first lateral frame of the one of the frame units and the second lateral frame of the other frame unit, and recesses which are formed on both sides of the connection portion. The slit has a first opening width. The connection portion includes a portion-to-be-cut which is to be sheared by a cutter. The recesses each have a second opening width greater than the first opening width, and allow the cutter to be inserted therein.

According to this embodiment, the lateral frames of the frame portions of the respective frame units which constitute a single flexure chain blank sheet can be made compact. Accordingly, even if the length of a flexure is slightly increased, the number of frame units formed on one flexure chain blank sheet can be kept as it is. Therefore, when a flexure is manufactured by using the flexure chain blank sheet, it becomes possible to use a flexure chain blank sheet including more flexure elements, and production of the flexures can be carried out efficiently.

In one embodiment, the flexure chain blank sheet comprises a first positioning hole which is formed at a place different from the connection portion of the first lateral frame, and also from the recesses. The connection portion may comprise a first connection portion and a second connection portion which are formed to be spaced apart from each other in a width direction of the frame portion, and the first positioning hole may be formed between the first connection portion and the second connection portion. The flexure elements comprise rear ends of tail portions, respectively, which are mutually connected by the first lateral frame. An example of the second lateral frame includes a distal end linking portion which connects distal end portions of the flexure elements to each other. A second positioning hole may be formed in the distal end linking portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A flexure chain blank sheet according to one embodiment will be hereinafter described with reference to FIGS. 1 to 8.

Figure 1:
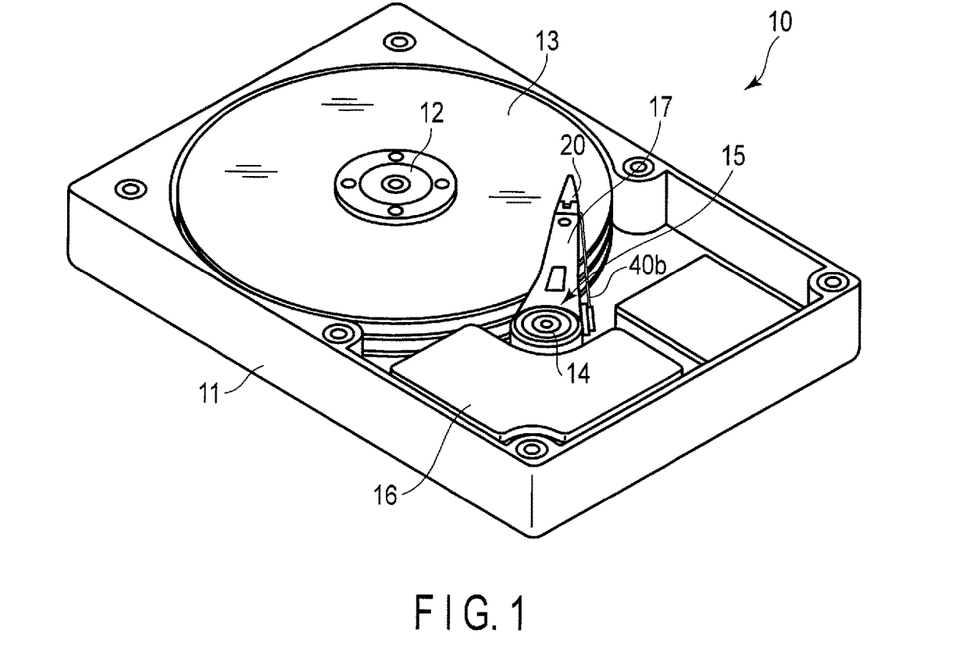
FIG. 1 is a perspective view showing an example of a disk drive.

A hard disk drive (HDD) 10 shown in FIG. 1 comprises a case 11, disks 13 rotatable about a spindle 12, a carriage 15 turnable about a pivot 14, and a positioning motor 16 for turning the carriage 15. The case 11 is sealed by a lid (not shown).

Figure 2:
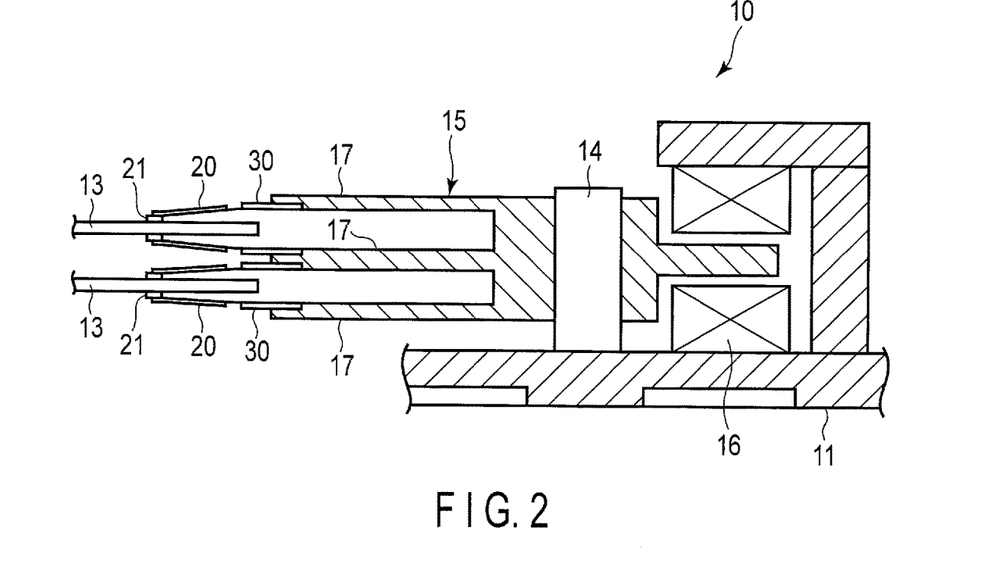
FIG. 2 is a cross-sectional view of a part of the disk drive shown in FIG. 1.

FIG. 2 is a cross-sectional view schematically showing a part of the disk drive 10. The carriage 15 is provided with arms 17. At a distal end portion of each arm 17, a disk drive suspension (hereinafter simply referred to as a suspension) 20 is mounted. At a distal end of the suspension 20, a slider 21 which serves as a magnetic head is provided. As each disk 13 rotates at high speed, an air bearing is formed between the disk 13 and the slider 21.

If the carriage 15 is turned by the positioning motor 16, the suspension 20 moves radially relative to the disk 13, and the slider 21 thereby moves to a desired track of the disk 13. The slider 21 is provided with a magnetic coil for recording data on the disk 13, a magneto resistive (MR) element for reading data recorded on the disk 13, etc. The MR element converts a magnetic signal recorded on the disk 13 into an electrical signal.

Figure 3:
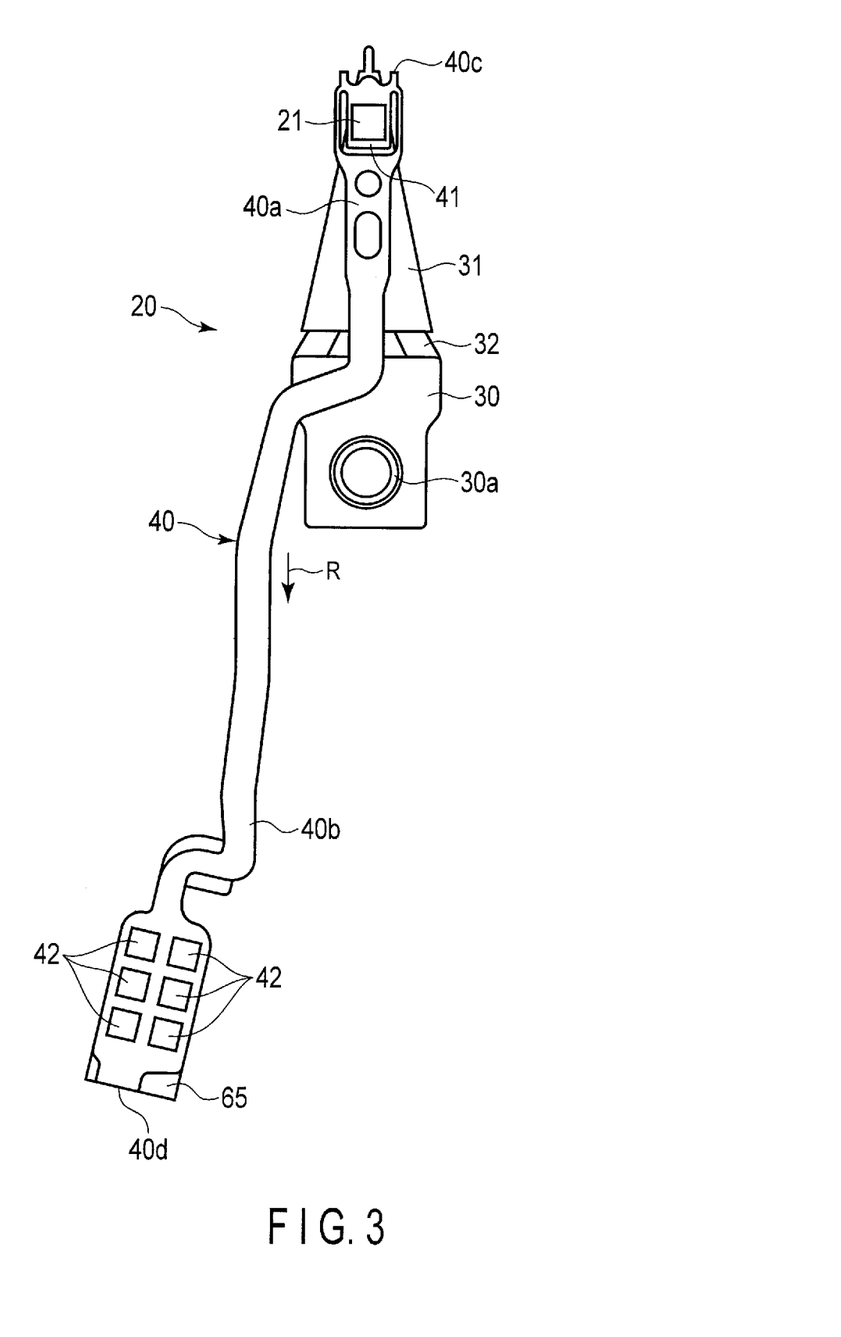
FIG. 3 is a plan view showing an example of a suspension.

FIG. 3 shows an example of the suspension 20. The suspension 20 comprises a baseplate 30, a load beam 31, a hinge portion 32, and a flexure 40 with conductors. The flexure 40 with conductors may be simply referred to as the flexure 40. A boss portion 30a of the baseplate 30 is secured to the arm 17 (FIGS. 1 and 2) of the carriage 15.

Figure 4:
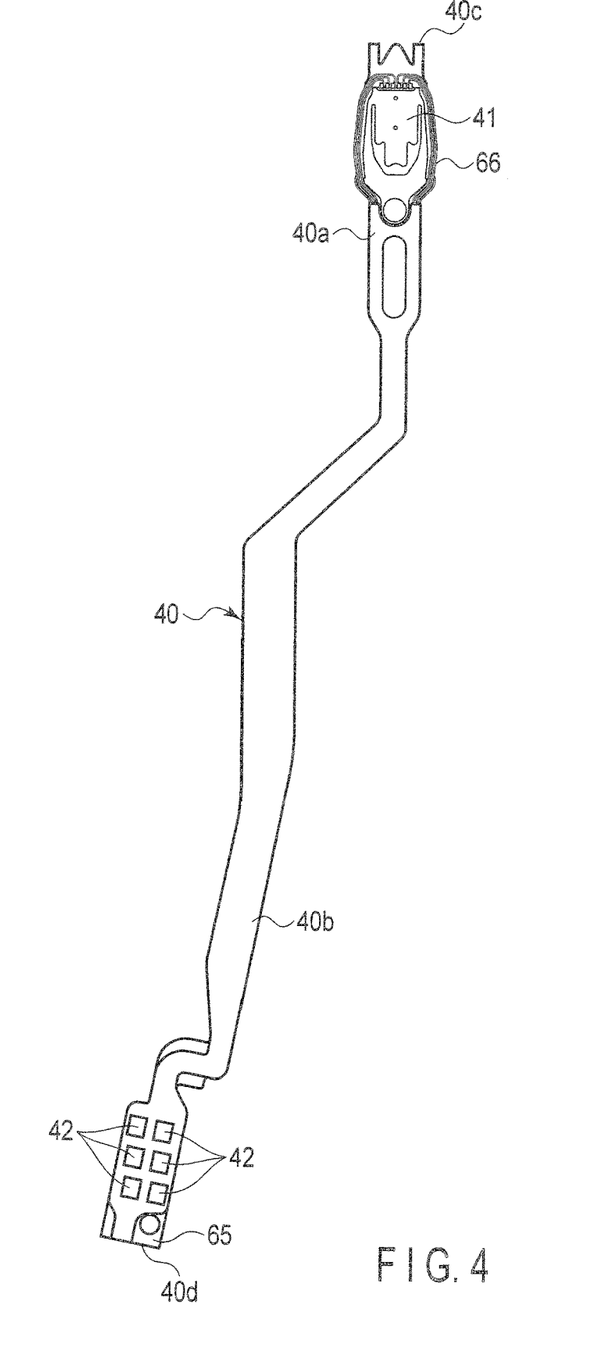
FIG. 4 is a plan view of a flexure of the suspension shown in FIG. 3.

FIG. 4 shows the flexure 40. The flexure 40 includes a proximal portion 40a overlapping the load beam 31 (FIG. 3), and a tail portion 40b extending toward the back (i.e., in the direction indicated by arrow R in FIG. 3) of the baseplate 30 from the proximal portion 40a. The proximal portion 40a of the flexure 40 is secured to the load beam 31 by fixing means such as laser welding. A tongue 41 is formed near a distal end portion 40c of the flexure 40. The slider 21 (FIGS. 2 and 3) is mounted on the tongue 41. A plurality of tail electrodes 42 are formed in the tail portion 40b.

Figure 5:
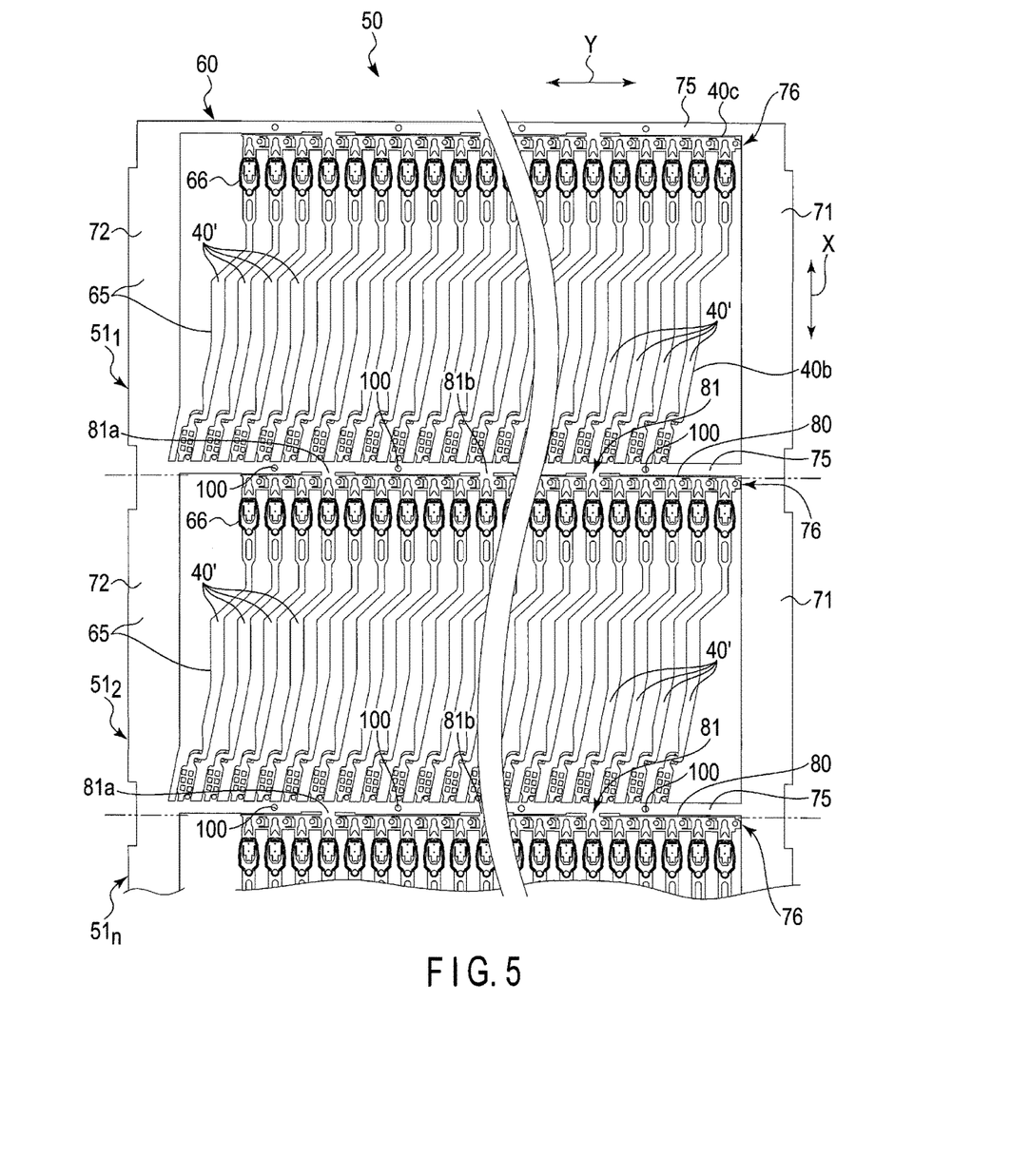
FIG. 5 is a plan view of a part of a flexure chain blank sheet according to one embodiment.
Figure 6:
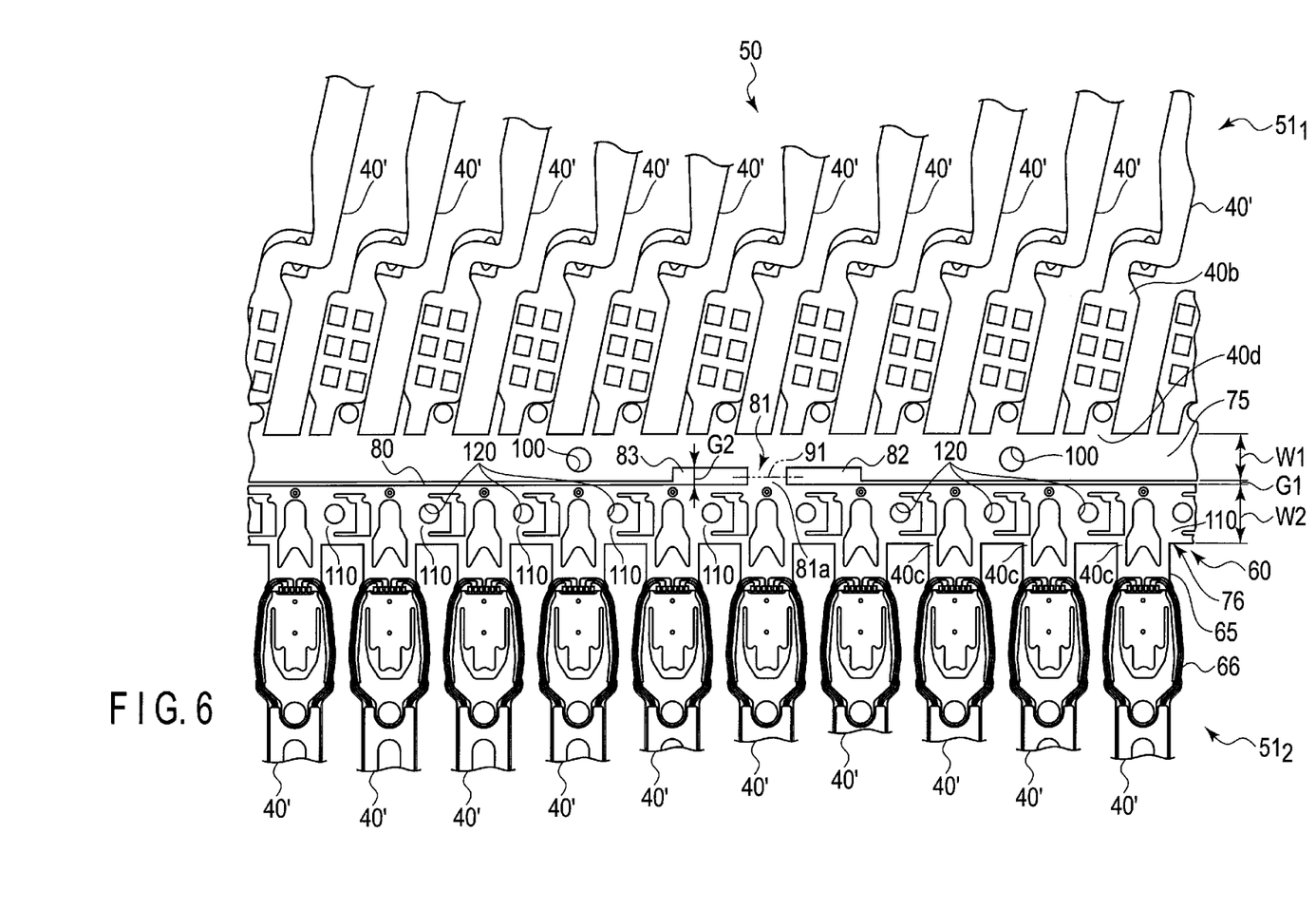
FIG. 6 is a partial enlarged view of the flexure chain blank sheet shown in FIG. 5.
Figure 7:
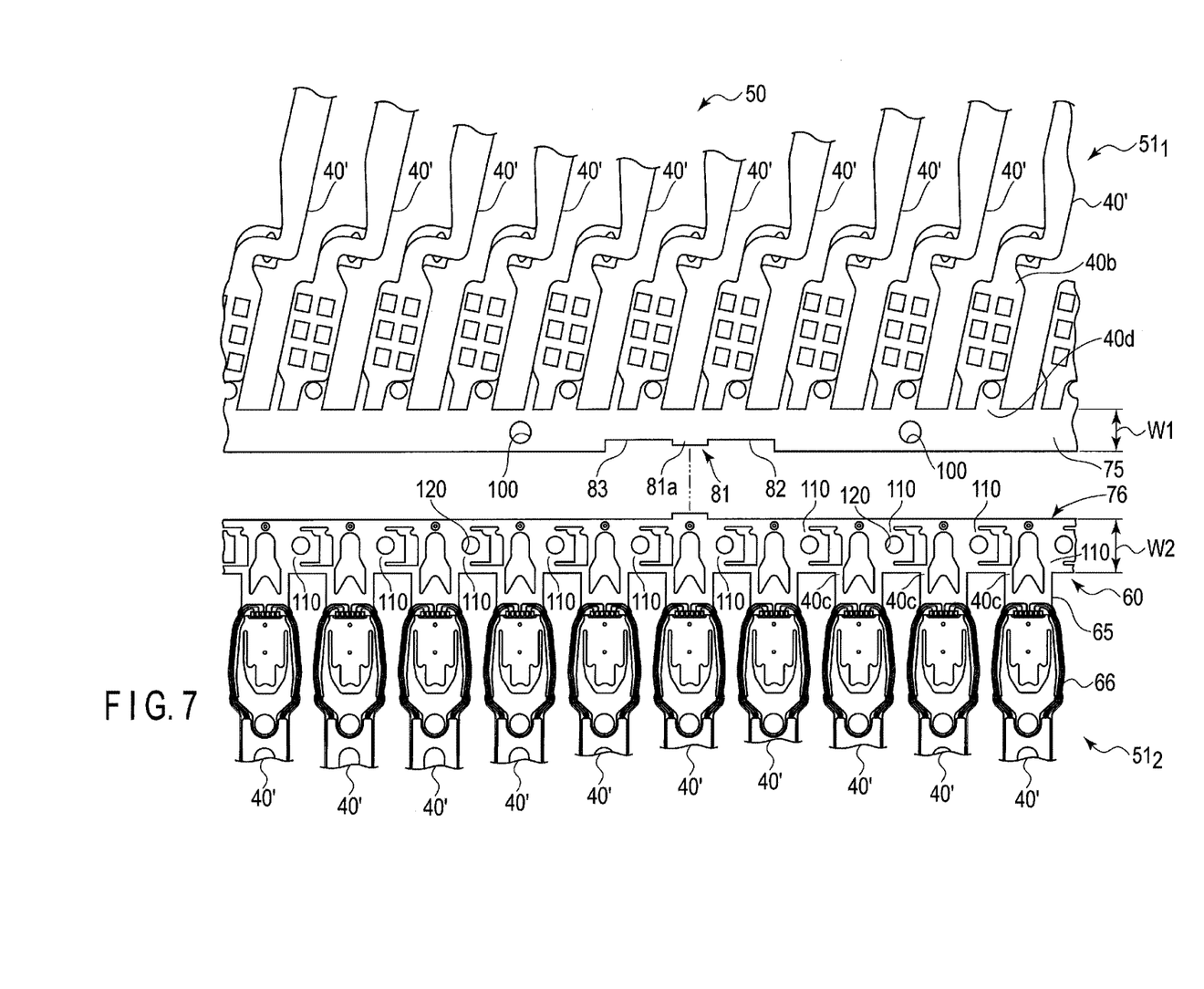
FIG. 7 is a plan view of a state in which frame units of the flexure chain blank sheet shown in FIG. 5 are separated from each other.

FIG. 5 is a plan view showing a part of a flexure chain blank sheet 50 used in a process of manufacturing the flexure 40. FIG. 6 is a partial enlarged view of the flexure chain blank sheet 50. The flexure chain blank sheet 50 includes a plurality of frame units $51_1$ to $51_n$. Each of these frame units $51_1$ to $51_n$ includes a frame portion 60 formed by etching a metal plate (for example, a stainless steel plate), and a plurality of (several tens to several hundreds of) flexure elements 40' formed at a predetermined pitch within the frame portion 60. An example of the metal plate is formed of austenitic stainless steel, and an example of the thickness is 18 μm (12 to 25 μm).

The frame units $51_1$ to $51_n$ include the frame portions 60 formed around the frame units $51_1$ to $51_n$, respectively, and a number of (several tens to several hundreds of) flexure elements 40' arranged at a predetermined pitch within their respective frame portions 60. Each of the flexure elements 40' includes a metal base 65 obtained by etching the metal plate (stainless steel plate), and a conductive circuit portion 66 formed on the metal base 65. The conductive circuit portion 66 includes an insulating layer formed on the metal base 65, a plurality of conductors made of copper which are formed on the insulating layer, and an electrically insulating cover layer covering these conductors.

The frame portion 60 includes a first lengthwise frame 71 and a second lengthwise frame 72, and a first lateral frame 75 and a second lateral frame 76. Each of the first lengthwise frame 71 and the second lengthwise frame 72 extends longitudinally relative to the flexure element 40' (i.e., in a longitudinal direction as indicated by double-headed arrow X in FIG. 5). Each of the first lateral frame 75 and the second lateral frame 76 extends laterally relative to the flexure element 40' (i.e., in a width direction as indicated by double-headed arrow Y in FIG. 5). By these pairs of lengthwise frames 71 and 72 and lateral frames 75 and 76, the frame portion 60 which is continuous all around each of the frame units is formed. In each of the frame units, rear ends 40d of the tail portions 40b of the flexure elements 40' are connected to each other by the first lateral frame 75.

A slit 80, a connection portion 81, and recesses 82 and 83 are formed between the frame units $51_1$ and $51_2$ which are adjacent longitudinally relative to the flexure chain blank sheet 50 (as indicated by double-headed arrow X in FIG. 5). The slit 80 has a first opening width G1 (FIG. 6). The slit 80 is formed between the first lateral frame 75 of the frame unit $51_1$, which is one of the adjacent frame units, and the second lateral frame 76 of the other frame unit $51_2$. The slit 80 extends longitudinally along the lateral frames 75 and 76.

Figure 8:
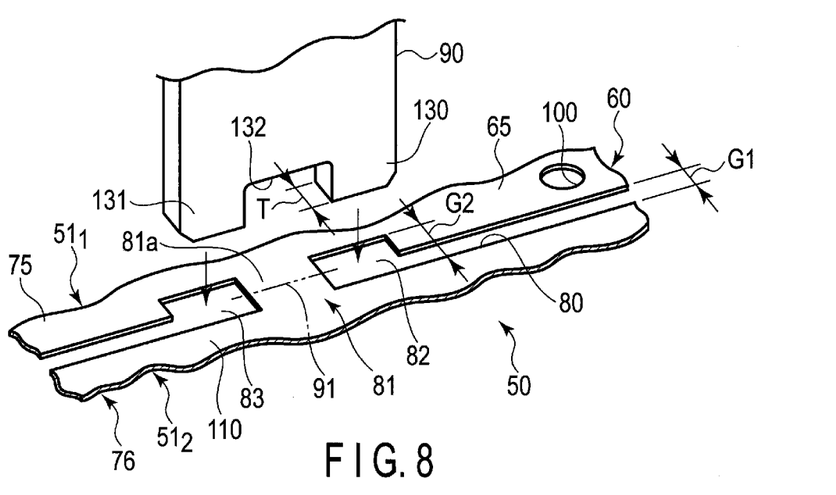
FIG. 8 is a perspective view showing an example of a part of a frame unit shown in FIG. 5 and a cutter.

The connection portion 81 and the recesses 82 and 83 are formed in the first lateral frame 75. The connection portion 81 connects the first lateral frame 75 of the frame unit $51_1$ on one side and the second lateral frame 76 of the frame unit $51_2$ of the other side to each other. The connection portion 81 is also represented as a first connection portion 81a and a second connection portion 81b formed to be spaced apart from each other laterally relative to the frame portion 60 (as indicated by double-headed arrow Y in FIG. 5). The first connection portion 81a and the second connection portion 81b each have a portion-to-be-cut 91 which is to be cut by a cutter 90 (FIG. 8).

Recesses 82 and 83 are formed on both sides of the first connection portion 81a. Recesses 82 and 83 are also formed on both sides of the second connection portion 81b. Each of these recesses 82 and 83 has a second opening width G2. The second opening width G2 is greater than the first opening width G1. Moreover, the second opening width G2 is greater than thickness T (FIG. 8) of the cutter 90. The first opening width G1 is less than thickness T of the cutter 90. That is, the recesses 82 and 83 have the shape and size which allow the cutter 90 to be inserted therein.

Further, at positions different from where the connection portion 81 is formed, a plurality of circular first positioning holes 100 are formed in the first lateral frame 75. Part of the first positioning holes 100 is formed between the first connection portion 81a and the second connection portion 81b, as shown in FIG. 5. Width W1 (FIGS. 6 and 7) of the first lateral frame 75 is greater than the outside diameter of the first positioning hole 100. Width W1 in this specification refers to a width dimension which is orthogonal to the longitudinal dimension of the first lateral frame 75. In the manufacturing process of the flexure 40, in order to keep the flexure chain blank sheet 50 at a predetermined position, a first positioning pin may be inserted into the first positioning hole 100.

In each of the frame units, a distal end linking portion 110 which connects distal end portions 40c of the flexure elements 40' to each other is formed. The distal end linking portion 110 constitutes the second lateral frame 76. In the flexure elements 40', second positioning holes 120 are formed, respectively, at intervals laterally relative to the frame portion 60 (as indicated by double-headed arrow Y in FIG. 5).

Width W2 (FIGS. 6 and 7) of the second lateral frame 76 is greater than the outside diameter of the second positioning hole 120. Width W2 in this specification refers to a width dimension which is orthogonal to the longitudinal dimension of the second lateral frame 76. In the manufacturing process of the flexure 40, in order to keep the flexure elements 40' at predetermined positions, a second positioning pin may be inserted into the second positioning hole 120.

FIG. 8 shows a part of the cutter 90 for cutting the connection portion 81, and the flexure chain blank sheet 50. An example of the cutter 90 comprises a pair of heels 130 and 131, and a blade 132 formed between the heels 130 and 131. When the connection portion 81 is cut, in a state in which the heels 130 and 131 are inserted into the recesses 82 and 83, and supported by a blade receiving jig, the connection portion 81 is cut (sheared) by the blade 132.

Figure 9:
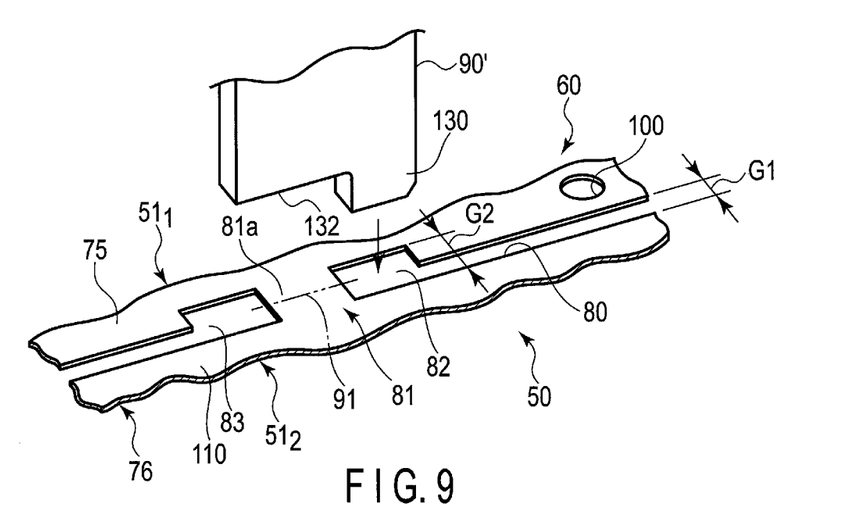
FIG. 9 is a perspective view showing a part of a cutter and a frame unit according to another embodiment.

The connection portion 81 may be cut by a one-sided-heel-type cutter 90' having a heel 130 on one side, as shown by the cutter 90' of another embodiment illustrated in FIG. 9. Alternatively, the connection portion 81 may be sheared by a cutter which does not have a heel.

The connection portion 81, the recesses 82 and 83 for cutter insertion, and the positioning holes 100 are formed in the first lateral frame 75 of the frame portion 60 of the flexure chain blank sheet 50. The connection portion 81 and the recesses 82 and 83 are formed at places different from where the positioning holes 100 are formed. The recesses 82 and 83 are shaped into such a form that they are recessed by the second opening width G2 at an interior side of width W1 (FIGS. 6 and 7) of the first lateral frame 75.

The first opening width G1 of the slit 80 formed in the flexure chain blank sheet 50 is less than thickness T (FIG. 8) of the cutter 90. However, since the recesses 82 and 83 having the second opening width G2 are formed on both sides of the connection portion 81, the space to allow the heels 130 and 131 of the cutter 90 to be inserted can be secured by the recesses 82 and 83. Moreover, a cutting allowance to be cut by the blade 132 of the cutter 90 can be secured by the connection portion 81 between the recesses 82 and 83.

In contrast, in a conventional flexure chain blank sheet, a slit having an opening width greater than the thickness of a cutter and a connection portion are formed alternately along the entire length of space between a pair of adjacent lateral frames. Further, by inserting the cutter into the slits, the connection portions are cut. When a lateral frame has the positioning holes, there is a limit on reducing the width of the lateral frame (the dimension which is orthogonal to the longitudinal dimension of the lateral frame). Accordingly, the greater the opening width of the slit is, the greater the outer dimensions (in particular, the length) of the flexure chain blank sheet becomes.

Depending on an apparatus or a jig to be used in the manufacturing process of the flexure, the size (outer dimensions) of a single flexure chain blank sheet may be restricted. In that case, once the length of the flexure chain blank sheet exceeds a permissible value if only a little, the number of frame units which can be formed in a flexure chain blank sheet must be reduced by one. In one frame unit, several tens of to several hundreds of flexure elements formed by etching are arranged at a predetermined pitch. Accordingly, reducing the frame unit by one means reducing several tens of to several hundreds of flexures per flexure chain blank sheet. Accordingly, there arises a problem that the manufacturing efficiency of flexures is drastically reduced.

However, according to the flexure chain blank sheet 50 of the present embodiment, even if the length of the flexure element is slightly increased according to the change in the specification of the flexure, it is possible to secure the same number of frame units as the conventional frame units within an allowable dimension of a single flexure chain blank sheet 50. That is, it is possible to prevent the number of flexure elements 40' formed on a single flexure chain blank sheet from being reduced. It is possible to form as many flexure elements 40' as possible on a single flexure chain blank sheet 50, and flexure 40 can be manufactured efficiently.

Also, needless to say, in carrying out the present invention, as well as the specific shape of the flexure and flexure element, each of the elements which constitute the flexure chain blank sheet may be modified variously, such as modifying the number and arrangement of the frame unit and flexure element, and the shape of the slit, connection portion, and recess. Also, a plurality of frame units may be formed in a row not only longitudinally but also laterally relative to the flexure chain blank sheet.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A flexure chain blank sheet for a disk drive suspension comprising a plurality of frame units, each of the frame units comprising:
- a frame portion made from a stainless steel plate; and
- a plurality of flexure elements arranged at a predetermined pitch within the frame portion, each of the plurality of flexure elements comprising a metal base formed from the stainless steel plate and a conductive circuit portion provided on the metal base,
- wherein the frame portion includes a first lengthwise frame and a second lengthwise frame extending in a longitudinal direction of the plurality of flexure elements, and a first lateral frame and a second lateral frame extending in a width direction of the plurality of flexure elements, and
- wherein the flexure chain blank sheet further comprises:
  - a slit which is formed between the first lateral frame of a first frame unit of the plurality of frame units and the second lateral frame of a second frame unit of the plurality of frame units, the first frame unit being adjacent to the second frame unit, and the slit having a first opening width;
  - a connection portion which connects the first lateral frame of the first frame unit and the second lateral frame of the second frame unit, the connection portion including a portion-to-be-cut which is to be sheared by a cutter; and
  - recesses which are formed on both sides of the connection portion, each of the recesses having a second opening width greater than the first opening width, and the second opening width allowing the cutter to be inserted into the recesses.

2. The flexure chain blank sheet of claim 1, wherein the flexure chain blank sheet further comprises a first positioning hole which is formed in the first lateral frame of the first frame unit at a place different from both the connection portion and the recesses.

3. The flexure chain blank sheet of claim 2, wherein the connection portion comprises a first connection portion and a second connection portion which are spaced apart from each other in a width direction of the frame portion, and the first positioning hole is provided between the first connection portion and the second connection portion.

4. The flexure chain blank sheet of claim 1, wherein each of the plurality of flexure elements comprises a tail portion and a rear end of the tail portion, and each rear end of the tail portion is connected to the first lateral frame.

5. The flexure chain blank sheet of claim 2, wherein each of the plurality of flexure elements comprises a tail portion and a rear end of the tail portion, and each rear end of the tail portion is connected to the first lateral frame.

6. The flexure chain blank sheet of claim 3, wherein each of the plurality of flexure elements comprises a tail portion and a rear end of the tail portion, and each rear end of the tail portion is connected to the first lateral frame.

7. The flexure chain blank sheet of claim 4, wherein each second lateral frame comprises a distal end linking portion and each of the plurality of flexure elements comprises a distal end portion, each distal end linking portion connecting the distal end portions of the plurality of the flexure elements.

8. The flexure chain blank sheet of claim 5, wherein each second lateral frame comprises a distal end linking portion and each of the plurality of flexure elements comprises a distal end portion, each distal end linking portion connecting the distal end portions of the plurality of the flexure elements.

9. The flexure chain blank sheet of claim 6, wherein each second lateral frame comprises a distal end linking portion and each of the plurality of flexure elements comprises a distal end portion, each distal end linking portion connecting the distal end portions of the plurality of the flexure elements.

10. The flexure chain blank sheet of claim 8, wherein a second positioning hole is provided in each distal end linking portion.

11. The flexure chain blank sheet of claim 9, wherein a second positioning hole is provided in each distal end linking portion.

* * * * *